(12) United States Patent
Kostic et al.

(10) Patent No.: US 12,493,760 B2
(45) Date of Patent: Dec. 9, 2025

(54) METHOD FOR MONITORING A WORK SYSTEM AND SYSTEM

(71) Applicant: Workaround GmbH, Munich (DE)

(72) Inventors: Stefan Kostic, Munich (DE); Sebastian Petruch, Munich (DE); Bozidar Jevic, Munich (DE)

(73) Assignee: WORKAROUND GMBH, Munich (DE)

( * ) Notice: Subject to any disclaimer, the term of this patent is extended or adjusted under 35 U.S.C. 154(b) by 0 days.

(21) Appl. No.: 18/624,601

(22) Filed: Apr. 2, 2024

(65) Prior Publication Data

US 2024/0330622 A1    Oct. 3, 2024

(30) Foreign Application Priority Data

Apr. 3, 2023  (DE) .......................... 102023108436.4

(51) Int. Cl.
*G06K 7/10* (2006.01)
*G06K 7/14* (2006.01)

(52) U.S. Cl.
CPC ....... *G06K 7/10366* (2013.01); *G06K 7/1413* (2013.01); *G06K 7/1417* (2013.01)

(58) Field of Classification Search
CPC . G06K 7/10366; G06K 7/1413; G06K 7/1417
USPC ...................................................... 235/451
See application file for complete search history.

(56) References Cited

U.S. PATENT DOCUMENTS

| 7,243,001 | B2 |   | 7/2007  | Janert et al. |
|-----------|----|---|---------|---------------|
| 9,842,288 | B1 | * | 12/2017 | DeBates ............. G06K 7/10366 |
| 10,198,706 | B2 | * | 2/2019 | Johnson ............. G06K 7/10297 |
| 11,205,270 | B1 | * | 12/2021 | Asmi ........................ G06T 7/90 |
| 11,914,771 | B2 | * | 2/2024 | Kirchner ............ G06K 7/10366 |
| 2016/0363997 | A1 | * | 12/2016 | Black ..................... G06F 3/014 |
| 2022/0159355 | A1 |   | 5/2022 | Nöllgen et al. |

(Continued)

FOREIGN PATENT DOCUMENTS

| DE | 102015111506 A1 | 4/2016 |
| DE | 102019118969 A1 | 1/2021 |
| DE | 102020106369 A1 | 9/2021 |

OTHER PUBLICATIONS

Dunn, J. C., et al., "Well-Separated Clusters and Optimal Fuzzy Partitions", Journal of Cybernetics, vol. 4, No. 1, 1974, pp. 95-104.

(Continued)

*Primary Examiner* — Ahshik Kim
(74) *Attorney, Agent, or Firm* — DILWORTH IP, LLC (57) ABSTRACT

A method for monitoring a work system including steps of receiving a plurality of scan data values acquired by a sensor of a sensor device and order indicators associated with the scan data values, determining pairwise similarities between the scan data values, determining a number of clusters for grouping the scan data values based on the determined pairwise similarities, grouping the scan data values into N clusters, wherein N is the number of clusters determined based on the determined pairwise similarities, assigning the scan data values to the clusters obtaining a grouped dataset of the scan data values, and outputting a signal based on the grouped dataset. Further, a system and a computer program are shown.

20 Claims, 3 Drawing Sheets

(56) References Cited

U.S. PATENT DOCUMENTS

2023/0069619 A1    3/2023   Nöllgen et al.
2024/0330620 A1*  10/2024   O'Hagan ........... G06K 7/10366

OTHER PUBLICATIONS

Frey, T., et al., "A Cluster Analysis of the D2 Matrix of White Spruce Stands in Saskatchewan Based on the Maximum-Minimum Principle", Journal of Ecology, vol. 60, No. 3, 1972, pp. 873-886.

Hubert, L. J., et al., "A general statistical framework for assessing categorical clustering in free recall.", Wisconsin Univ. Madison Research and Development Center for Cognitive Learning, Oct. 1975, 27 pages.

Levenshtein, V. N., "Binary Codes With Correction of Delays and Insertions and Character Replacements", Reports of the USSR Academy of Sciences, vol. 163, No. 4, 1965, 5 pages. (English translation in Soviet Physics Doklady, 10(8):707-710, 1966).

Mcclain, J. O., et al., "Clustisz: A Program to Test for the Quality of Clustering of a Set of Objects", Journal of Marketing Research, vol. 12, No. 4, Nov. 1975, pp. 456-460.

Rousseeuw, P. J., "Silhouettes: A graphical aid to the interpretation and validation of cluster analysis", Journal of Computational and Applied Mathematics, vol. 20, Nov. 1987, pp. 53-65.

Ward, J. H., et al., "Hierarchical Grouping to Optimize an Objective Function", Journal of the American Statistical Association, vol. 58, No. 301, Mar. 1963, 10 pages.

Extended European Search Report and Search Opinion received for EP Application No. 24167701.2, mailed on Aug. 27, 2024, 9 pages.

* cited by examiner

METHOD FOR MONITORING A WORK SYSTEM AND SYSTEM

FIELD OF THE DISCLOSURE

The disclosure relates to a method for monitoring a work system, a system comprising the work system and a computer program.

BACKGROUND

Work systems by means of which complex physical processes are executed are known. Here, several physical process steps are normally executed by machines and other physical process steps by workers or users.

The machines may be industrial robots or devices that are wearable by the user, such as barcode readers.

The users may be instructed by wearable devices, such as barcode readers, so that they execute the step required at that time in the complex physical process correctly.

Examples of such work systems are assembly lines of complex products, such as cars, or large distribution warehouses.

However, the physical processes executed with work systems are usually designed at the drawing board without any practical feedback from real life or the factory buildings in which the processes are executed.

Although these processes are very efficient in theory, they contain more often than not hidden inefficiencies resulting from bottlenecks, intended or unintended process deviations by the users or due to the spatial conditions of the work system or factory building in which the work system is used.

In addition, IT systems of the company using the work system are only adaptable to the work system with great difficulty as these are usually extremely complex due to their deep integration in the respective company.

For these reasons, such work systems are difficult to monitor and to check for efficiency. Moreover, problems cannot be identified promptly.

SUMMARY

Thus, there is provided a method for monitoring a work system as well as a system that enables a detailed monitoring of the work system with little additional input.

For this purpose, a method for monitoring a work system comprising at least one sensor device with a sensor is provided. The method comprises the following steps:
  receiving a plurality of scan data values acquired by the sensor of one or more of the at least one sensor device and order indicators associated with the scan data values indicating the order in which the scan data values have been acquired,
  determining pairwise similarities between the scan data values,
  determining a number of clusters for grouping the scan data values based on the determined pairwise similarities,
  grouping the scan data value into N clusters, wherein N is the number of clusters determined based on the determined pairwise similarities,
  assigning the scan data values to the clusters obtaining a grouped dataset of the scan data values, and
  outputting a signal based on the grouped dataset.

The method allows automatically sorting scan data values obtained during operation of the work system into clusters that provide information about the state of the work system allowing monitoring.

The grouped dataset allows further analysis to identify deviations from the intended physical process or bottlenecks.

In particular, each scan data value is associated with one order indicator and vice versa.

For example, the pairwise similarity is calculated between all scan data values or a sample of the scan data values.

The grouping of the scan data values into N clusters and/or the previous steps may be carried out on only a sample of the scan data values, saving resources. Once the N clusters are determined, the remaining scan data values are assigned to the N clusters.

It is conceivable that a user and/or administrator may manually change the cluster a specific scan data value or generalized data value has been grouped into.

Alternatively or in addition, prior to grouping the scan data value into N clusters, a user and/or administrator may manually set or define a cluster into which a specific scan data value or generalized data value is to be grouped into.

It is also conceivable that more than one clusters are set or defined manually by the user and/or the administrator.

In particular, the method for monitoring the work system is a computer implemented method.

One, several or all of the above step may be carried out by a monitoring system for the work system.

In an embodiment, the order indicators include a time stamp of the time the associated scan data value has been acquired, an identifier of a user and/or an identifier of the sensor device which has acquired the associated scan data value, allowing very precise identification of the order in which the scan data values have been acquired.

In an aspect, for determining pairwise similarities between the scan data values, at least the following steps are performed:
  converting the scan data values in generalized data values according to a predefined conversion scheme, and
  determining pairwise similarities between the generalized data values,
wherein the pairwise similarities between the generalized data values are used as the pairwise similarities between the respective scan data values. This way, the pairwise similarities reflect more accurately different types of scan data values.

Each generalized data value may be associated with the scan data value it was converted from and/or with the order indicator during processing.

It is also conceivable that the pairwise similarities are determined based on the scan data values itself.

For further increasing the usefulness of the clustering, the predefined conversion scheme may include converting each letter of the scan data values into a predefined letter substitution character, for example the character "1", and/or converting each numerical digit of the scan data values into a predefined digit substitution character, for example the character "n", in particular wherein characters of the scan data values other than letters or numerical digits are preserved.

In an embodiment, for grouping the scan data values into N clusters, the generalized scan data values are grouped into N clusters. The N clusters are subsequently used and the scan data values are assigned to these N clusters. By grouping the generalized scan data values the clustering is more efficient.

In this case, scan data values are assigned to the N clusters established by clustering the generalized data values.

In an aspect, for determining the pairwise similarities, a distance metric is applied, in particular the Levenshtein distance, further increasing precision.

The Levenshtein distance referred to in this disclosure is the metric derived by Vladimir I. Levenshtein (as published in Vladimir I. Levenshtein, Binary codes capable of correcting deletions, insertions, and reversals, Doklady Akademii Nauk SSSR, 163 (4): 845-848, 1965 (Russian). English translation in Soviet Physics Doklady, 10 (8): 707-710, 1966) or a metric based thereon.

In an embodiment, the number of clusters is determined by evaluating the suitability of different numbers of clusters for clustering the scan data values and/or the generalized data values based on the pairwise similarities using one evaluation algorithm, wherein the number of cluster with the best evaluation is chosen as an evaluation result or more than one evaluation algorithm, wherein a consensus score of the results of the evaluation algorithms is calculated and the number of clusters with the best evaluation score is chosen as an evaluation result. This way, the number of clusters is reliably chosen to yield a meaningful output.

In particular, the evaluation result is used as N for the N clusters to be used

Evaluation algorithms to be used as the one or more evaluation algorithms May be the algorithm by Frey (Frey, T., and H. Van Groenewoud. "A cluster analysis of the D2 matrix of white spruce stands in Saskatchewan based on the maximum-minimum principle." The Journal of Ecology (1972): 873-886), Dunn (Dunn, J. C. (1974). Well-separated clusters and optimal fuzzy partitions. Journal of cybernetics, 4 (1), 95-104), Hubert (Hubert, L. J., & Levin, J. R. (1976). A general statistical framework for assessing categorical clustering in free recall. Psychological bulletin, 83 (6), 1072), Rousseeuw (Rousseeuw, P. J. (1987). Silhouettes: a graphical aid to the interpretation and validation of cluster analysis. Journal of computational and applied mathematics, 20, 53-65) and/or McClain (McClain, J. O., & Rao, V. R. (1975). Clustisz: A program to test for the quality of clustering of a set of objects. Journal of Marketing Research, 456-460) or an algorithm based thereon.

In order to also handle scan data values and/or generalized data values with short character strings, N for the N clusters may the evaluation result from above plus 1 per additional cluster provided for scan data values and/or the short generalized data values, in particular wherein an additional cluster is provided for generalized data values consisting only of the letter substitution character and having a length smaller than a predefined length threshold and/or an additional cluster is provided for generalized data values consisting only of the predefined digit substitution character and having a length smaller than a predefined length threshold.

For example, the predefined length value for generalized data values consisting only of letter substitution characters may be 2, 3 or 4 and/or the predefined length value for generalized data values consisting only of letter substitution characters may be 2, 3, 4 or 5.

For example, a clustering algorithm is used for grouping the scan data values and/or the generalized data values into the N clusters, in particular Ward's hierarchical clustering algorithm, yielding very precise results.

In particular, the use of a distance metric before applying the clustering algorithm allows the Ward's hierarchical clustering algorithm to be used on scan data values being character strings.

The Ward's hierarchical clustering algorithm referred to in this disclosure is the algorithm derived by J. H. Ward Jr (as published in: Ward Jr, J. H. (1963). Hierarchical grouping to optimize an objective function. Journal of the American statistical association, 58(301), 236-244) or any algorithm based thereon.

In order to increase the meaningfulness of the clusters further, at least one of the N clusters may be clustered into subclusters.

In an embodiment, for each cluster and/or subcluster, a scan data value and/or a generalized data value of the respective cluster and/or subcluster is chosen as a scan data cluster representative or generalized data cluster representative, respectively, in particular wherein the scan data cluster representative is the scan data value with the most similarity to the remaining scan data values in the respective cluster and/or subcluster, or the generalized data cluster representative is the generalized data value with the most similarity to the remaining generalized data values in the respective cluster and/or subcluster, respectively. This way, the sorting of scan data values or generalized data values into clusters is simplified.

For example, the most similarity may be determined as the smallest square of the sum of the absolute Levenshtein distances to all the remaining scan data values and/or generalized data values in the respective cluster and/or subcluster.

The scan data cluster representative may convert into the generalized data cluster representative according to the predefined conversion scheme.

In an aspect, the N clusters and/or the subclusters, in particular the scan data cluster representative and/or the generalized data cluster representative of the N clusters and/or the subclusters, are assigned to real-world counterparts, for example a specific type of objects, a specific object, a specific location and/or a specific type of information. This way, process steps can be directly derived from the grouped dataset simplifying further analysis.

For example, types of objects may be "item" or "box", specific object may be "shelf 1" or "door A3", a specific location may be "packing station", and/or a specific type of information may be "user ID" or "address".

In an embodiment, connections between the clusters and/or subclusters are determined, in particular wherein a pair of scan data values or generalized data values being consecutive and being acquired by the same sensor device—as determined based on the order indicator—is regarded as a connection from the cluster and/or subcluster of the earlier one of the data value of the pair of scan data values or generalized data values to the cluster and/or subcluster of the later one of the data value of the pair of scan data values or generalized data values. By using connections, the sequence of the physical process can be monitored.

The data value of the pair of scan data values or generalized data values may be in same cluster or subcluster.

In particular, the number of connections and their direction between each pair of clusters or each pair of subclusters, respectively, is determined.

For simplifying further analysis, a representation of the physical process carried out by the work system may be generated based on the grouped dataset and/or connections between the clusters and/or subclusters.

In an aspect, a control system of the work system controls the plurality of sensor devices at least in part for the purpose of executing a physical process assigned to the corresponding sensor devices, in particular wherein the sensor devices are controlled based on the grouped dataset and/or the representation of the physical process. In this way, the user W can be guided very effectively.

For providing versatile functionality and a high level of ergonomics the sensor of the sensor devices may be a camera, an optical code reader and/or an RFID code reader, the sensor device comprises at least one actuating element, and/or the sensor device comprises at least one output means.

In an embodiment, the work system comprises a plurality of connection devices, wherein each connection device is connected to one or more of the sensor devices via a wireless communication link and is connected to the control system via a wired or wireless communication link or is configured on the same device. By using connection devices, the sensor device can be configured simply and, in particular, without performant processors, thereby enabling the sensor device to be particularly compact.

In an aspect, a scan data value is generated by the sensor of the sensor device, in particular wherein the scan data value comprises or is a character string coded in a code having been read by the sensor. This way, data obtained during operation of the work system can directly be used for monitoring.

Within this disclosure, the term "code" is to be understood as any type of machine readable code, in particular optical codes, for example a barcode, a QR code, a data matrix code or suchlike, or RFID codes encoded in an RFID tag.

The order indicator may be associated with the scan data value by the sensor device and/or the connection device.

For control of the work system or analysis, the grouped dataset and/or the representation of the physical process may be transmitted to at least one of the control system, an inventory management system, an enterprise resource planning system, a mobile end device, a workplace computer or an output means.

It is conceivable that based on the grouped dataset and/or the representation of the physical process the monitoring system detects inefficiencies, bottlenecks or deviations from the physical process. The monitoring system may then generate a hint, suggestion, report and/or warning based on these findings and transmits this hint, suggestion, report and/or warning to a user or administrator of the work system.

For above mentioned purpose further a system is provided. The system comprises a work system comprising a plurality of sensor devices with a sensor and a monitoring system, wherein the system, in particular the monitoring system is configured to carry out a method as described above.

Further, for above mentioned purpose a computer program is provided, comprising instructions which, when the program is executed by a computer, cause the computer to carry out the as described above.

The features and advantages described with respect to the method also apply to the system and/or computer program and vice versa.

BRIEF DESCRIPTION OF THE DRAWINGS

Further features and advantages of the disclosure are described in the following description as well as the accompanying drawings to which reference is made. In the drawings.

DETAILED DESCRIPTION

Lists having a plurality of alternatives connected by "and/or", for example "A, B and/or C" are to be understood to disclose an arbitrary combination of the alternatives, i.e. the lists are to be read as "A and/or B and/or C" or as "at least one of A, B or C". The same holds true for listings with more than three items.

Figure 1:
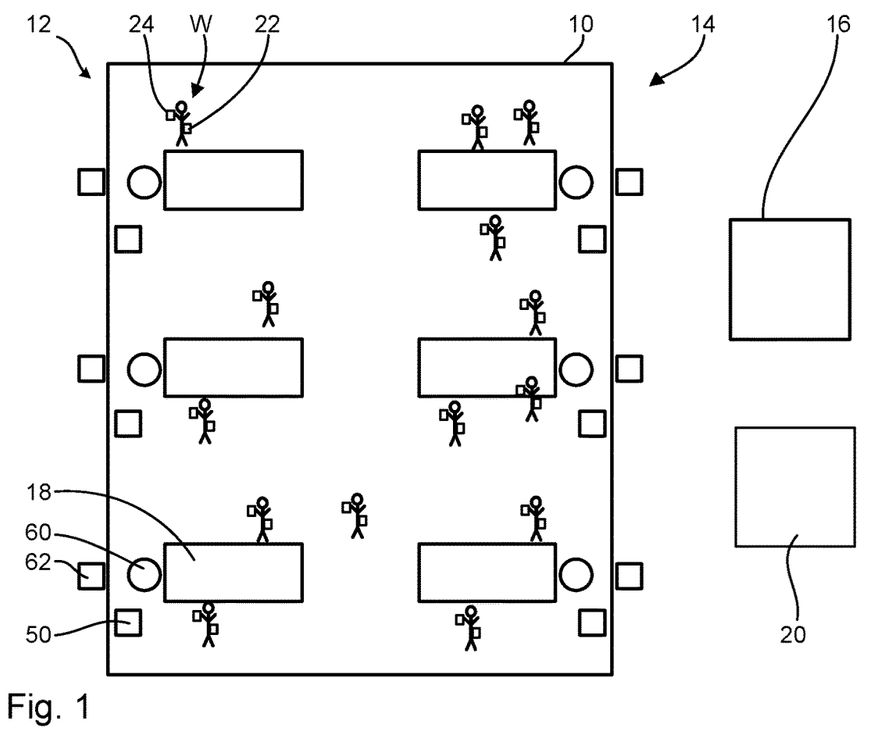
FIG. 1 shows a building comprising a system according to a first embodiment of the disclosure schematically.

In FIG. 1, a factory building 10 is shown in an aerial perspective extremely schematically as well as a system 12 in an aerial perspective.

The system 12 has a work system 14 as well as a monitoring system 16.

The building 10 is, for example, a production building in which a product is produced. For example, the product is a vehicle or parts for this.

To manufacture the product, a predefined physical process comprising various process steps is to be executed which are executed by the workers, hereinafter termed users W.

It is conceivable that autonomous robots or drones are deployed as the user W instead of or in addition to the workers.

To this end, different workstations 18 of the work system 14 are located in the factory building 10, at said workstations one or more of the process steps are executed.

In the shown embodiment, two production lines each comprising three workstations 18 are provided. The workstations 18 of a production line neighbour each other; in FIG. 1, they are opposite to each other.

The production lines are thus arranged parallel to each other.

In addition, the work system 14 comprises a control system 20, several connection devices 22 as well as several sensor devices 24.

Figure 2:
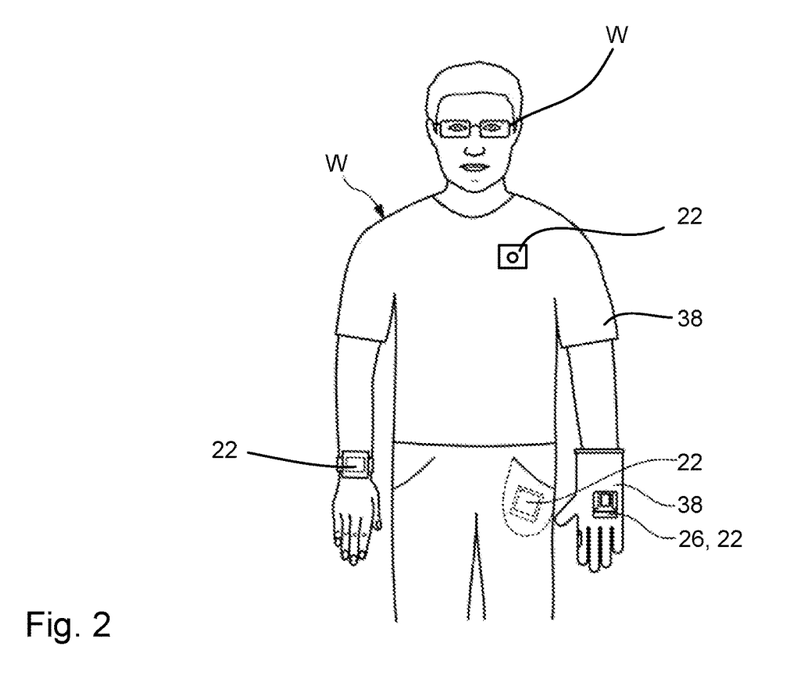
FIG. 2 shows a user of the system with sensor device and connection devices of the system according to FIG. 1.

The sensor devices 24 are worn by the users W. For example, each user W wears at least one or more sensor device 24, as shown in FIG. 2.

The sensor device 24 comprise a sensor 28 as well as optionally an output means 30 and an actuating element 32.

For example, a sensor device 24 can also be a camera, for example a helmet camera or a camera attached to a garment. The camera acts as the sensor 28 and optional screens, LEDs, loudspeakers or pushbuttons of the camera act as output means 30 or actuating element 32.

An optical code reading device may also be a sensor device 24, wherein the code reader of the optical reading device is the sensor 28 and optional screens, LEDs, loudspeakers or pushbuttons of the camera act as output means 30 or actuating element 32.

Wearable devices 26, as known as secondary devices in DE 10 2019 118 969 A1 or DE 10 2020 106 369 A1 (which are in this regard incorporated by reference), can also be sensor devices 24.

Figure 3:
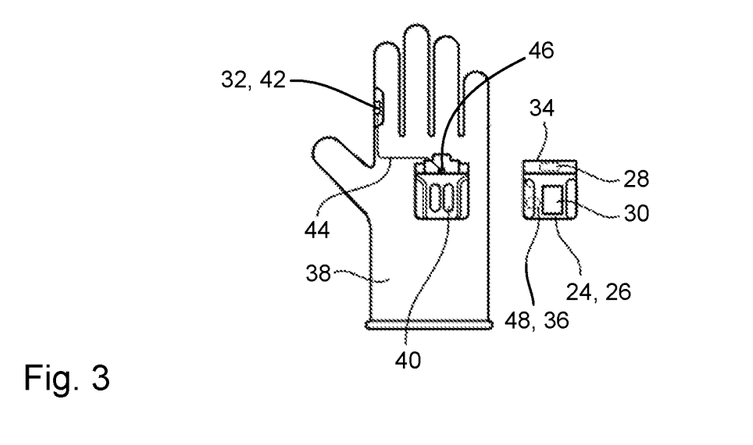
FIG. 3 shows a schematic view of a wearable device as a sensor device according to FIG. 2.

The wearable device 26 has a sensor 28, a screen as output means 30, a control unit 34 comprising a communication module 36 and a power storage medium, such as a storage battery.

The wearable device 26 also has an actuating element 32, for example in the form of a pushbutton or owing to the fact that the screen is configured to be touch sensitive.

The wearable device 26 is, in particular, a device whose function is limited to specialized applications. To this end, it can be an embedded system and/or have a compact form.

For example, the wearable device 26 is not a multi-functional device, thus is not a smart device, such as a smartphone, a tablet, a smart watch or smart glasses.

It is also conceivable that the sensor device 24 is a smart device, such as a smartphone, a tablet, a smart watch or smart glasses. The sensor 28 is, for example, an optical sensor, such as a code reader or a camera.

It is also conceivable that the wearable device 26 as the sensor 28 comprises other sensor units, such as an RFID reader in addition to or instead of the optical sensor.

The term "code" is to be understood as any type of machine readable code, in particular optical codes, for example a barcode, a QR code, a data matrix code or suchlike, or RFID codes encoded in an RFID tag.

However, it should be noted that this embodiment is purely exemplary for illustration purposes. Alternatively, the wearable device 26 can be designed without a screen.

As can be seen in FIG. 3, the work system 14 has in addition a garment 38, in particular a glove, by means of which the wearable device 26 can be fastened to the body of the user W. The wearable device 26 or the combination of the garment 38 and the wearable device 26 is what is termed a "wearable".

The garment 38 has a holder 40 in which the wearable device 26 can be fastened and removed without tools in a repeatable manner.

The garment 38 can also have an input means 42, for example a trigger, like a pushbutton, for the wearable device 26. The trigger or the input means 42 can be provided on a finger of the glove or on a portion of the glove at the metacarpophalangeal joint. It is also conceivable that said at least one input means 42 or one or several further input means 42 are provided on the holder 40.

By means of at least one cable 44 and at least one contact 46 in the holder 40, the input means 42 is connected to the wearable device 26 as soon as the wearable device 26 is inserted in the holder 40.

The input means 42 on the garment 38 can thus also be regarded as an actuating element 32 of the sensor device 24.

The sensor devices 24 all comprise a communication module 48, via which the sensor devices 24 are connected to the connection devices 22.

The connection devices 22 are devices that typically have a greater computing power as the sensor devices 24, in particular the wearable devices 26. For example, the connection devices 22 are designed as smart devices, such as a smartphone, a tablet, a smart watch or smart glasses, or a wristband equipped with corresponding processors and communication modules. In this case, the connection devices 22 are also mobile and are worn by the user W.

The combination of the wearable device 26 and the connection device 22 corresponds to the example of the sensor and information system comprising a secondary device (wearable device 26) and main device (connection device 22) of DE 10 2019 118 969 A1 or DE 10 2020 106 369 A1 (which are in this regard incorporated by reference).

It is, however, conceivable that stationary devices, such as base stations for wireless communication, e.g. WLAN access points or mobile base stations, are used as connection devices 22, but also stationary devices that operate as WLAN clients. Connection devices 22 can also be connected per USB to a computer or the control system 20 and per wireless communication to the sensor device 24.

It is also conceivable that a sensor device 24 is built into a single device with the connection device 22.

The connection devices 22 maintain a communication link, on the one hand, with the control system 20 and, on the other hand, with the sensor device 24 assigned to them.

In doing so, several sensor devices 24 can be assigned to one of the connection devices 22. For example, it is however not possible that a sensor device 24 is connected simultaneously to several connection devices 22.

The control system 20 is operated on one or more central computers and/or servers.

The control system 20 is, for example, an inventory management system, an enterprise resource planning system (ERP system) or suchlike and is used for monitoring, for quality management and optionally for controlling the physical processes of the work system 14, e.g. the processes for producing the product.

The control system 20 is connected directly or indirectly via a communication link to each of the connection devices 22 permanently or temporarily.

This communication link can occur wirelessly, wired or through a combination of these. For example, the connection devices 22 are connected, in particular if it is a mobile device, via wireless communication links to gateways 50 of the work system 14, wherein the gateways 50 have in turn a wired communication link to the control system 20, e.g. by means of LAN or the Internet. The gateways 50 are merely shown as dashed lines in FIG. 4.

Figure 4:
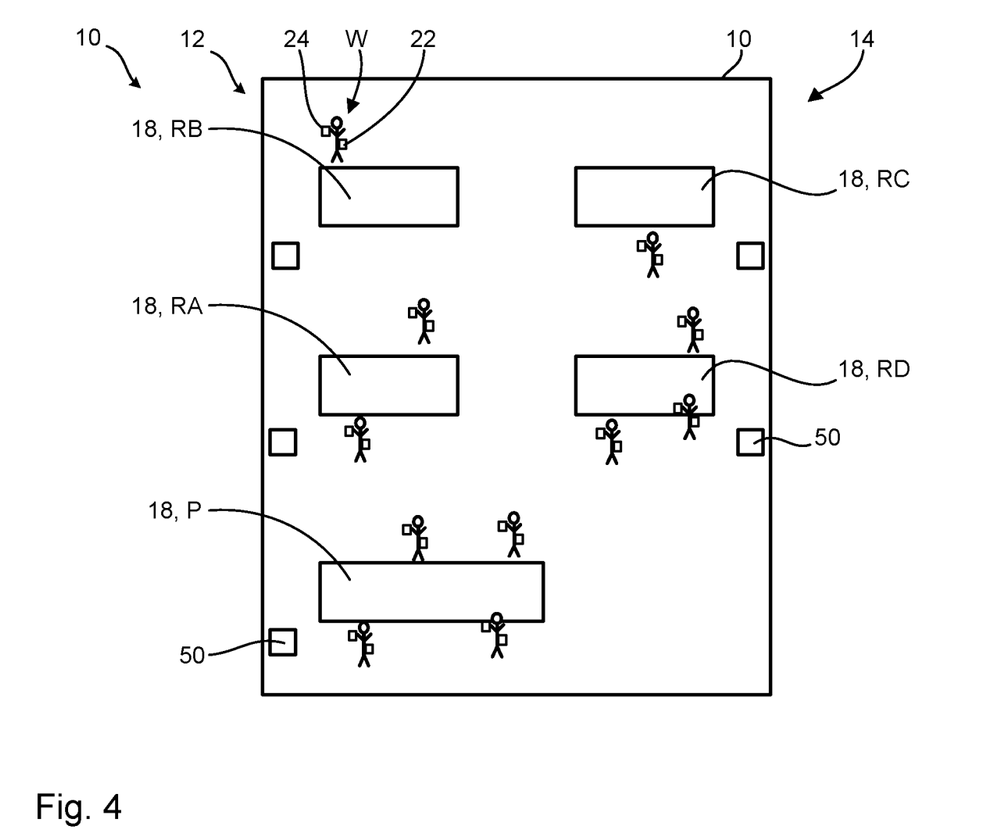
FIG. 4 shows a work system according to a second embodiment of the disclosure schematically.

The gateways 50 can be simultaneously connection devices 22 to which the sensor devices 24 directly connect.

The monitoring system 16 may be configured as an application on one or more central computers or servers. The monitoring system 16 has a communication link to the connection devices 22 and/or the sensor devices 24.

Simultaneously it is possible that one or more of the connection devices 22 even assumes the function of the monitoring system 16 and thus is also to be regarded as at least part of monitoring system 16.

Similarly, it is conceivable that one or more connection devices 22 execute the functions of the control system 20. Thus, the connection device 22 can be both part of the monitoring system 16 as well as part of the control system 20.

The user W works at various workstations 18 with the help of the sensor device 24 in order to manufacture the product.

While the user W at one of the workstations 18 executes the process steps belonging to this workstation 18, the user W uses the sensors 28 of the sensor device 24 or the sensors 28 are activated automatically.

For example, before installing a component on the product, the worker W must capture a barcode of the product by means of the sensor 28 of the sensor device 24. To read the barcode, the worker W triggers, for example, the sensor 28 by actuating the input means 42 on the garment 38.

As a result, the barcode is read and a scan data value is generated by the sensor 28.

For example, the scan data value is the character string that is encoded in the barcode that as just been read by the sensor 28.

In case of an RFID sensor as the sensor 28, the scan data value may be the characters string encoded in an RFID tag.

Further, an order indicator is generated by the sensor 28 and associated with the scan data value. The order indicator includes, for example, a timestamp indicating the time and date the scan data value was generated and an identifier of the sensor device 24 the sensor 28 belongs to. It is also conceivable that the order indicator comprises an identifier of the user W currently operating the sensor device 24.

Thus, for each code that has been read, a scan data value comprising the contents of the code and an associated order indicator is generated.

The scan data value and the associated order indicator generated by the sensor device 24 is then transmitted to the connection device 22. The connection device 22 transmits the scan data value and the associated order indicator on to the control system 20. This can take place by means of device-internal transmissions provided that parts of the control system 20 are configured on the connection device 22.

It is also conceivable that the order indicator is not or not fully generated by the sensor 28 but the connection device 22 adds and/or associates the order indicator with the scan data value.

The control system 20 can guide or control the sensor device 24 at least in part to execute a physical process or physical process steps. In particular, this is the physical process or are the physical process steps that were assigned to the corresponding workstation 18 or even the exact sensor device 24. To this end, the physical process or physical process steps assigned to different sensor devices 24 of a user W may differ.

For example, the control system 20 checks the obtained scan data value with the intended physical process steps that are executed in the building 10 or at the specific workstations 18.

In the control system 20, the physical processes and physical process steps are stored so that the control system 20 already expects certain scan data values from the sensor device 24. The control system 20 can now compare the obtained scan data values with the expected values and provide feedback as the result of the comparison.

Moreover, the control system 20 can transmit a control instruction to the same or another sensor device 24 in order to guide the user W. For example, the user W can be informed about whether the user W wants to assemble the correct part or whether the correct code has been read. The user W can also be transmitted further information by means of the output means 30. To this end, the control instruction comprises, for example, information, in particular text, that is to be shown on the screen of the wearable device 26.

The control instruction has been transmitted from the control system 20 to the corresponding sensor device 24 by means of the gateway 50 or the connection device 22.

The corresponding sensor device 24 receives the control instruction S and executes the instructions contained in control instruction S.

The user W can then transfer to the next physical process step or, if other instructions are being communicated, execute these.

To this end, the connection device 22 can assume all or parts of these activities of the control system 20 for the purpose of information and guidance of the user W. This is disclosed, for example, in DE 10 2019 118 969 A1 or DE 10 2020 106 369 A1, which are in this regard incorporated by reference.

In this way, the user W will generate further scan data values continuously while working.

FIG. 4 shows a second embodiment of the system 12 according to the disclosure, which is located in the factory building 10. For the sake of clarity, the monitoring system 16 is not shown.

The work system 14 of the system 12 acts in the second embodiment for dispatching shipments.

For this purpose, the work system 14 has four racks RA, RB, RC, RD, in which goods are stored, as workstations 18 as well as a packing station P in which the collected goods are packed for distribution.

Users W of the work system 14 have either the task to collect goods from the racks RA-RD and to bring to the packing station P (what is termed a "picker"). The users W who pack the goods in cardboard boxes (referred to as "packers") are divided into groups at the packing station P.

Accordingly, the physical process steps differ from each other which are executed by various users W so that the configuration of the sensor devices 24, in particular the wearable device 26, are different.

A user W who works as a "picker" starts at the packing station P and receives an order to collect some good from the racks RA-RD.

For this purpose, the sensor device 24 of the user W is controlled in such a way by the control system 20 that the user W is instructed to go to a certain one of the racks RA-RD in order to remove the good stored there. These instructions are received by the user W, for example, via the output means 30 of the sensor device 24, such as the screen of the wearable device 26.

At the start of each aisle for collecting goods, the user W reads a barcode, RFID, user input etc. with the sensor 28 at the packing station P that is attached there.

Arriving at one of the racks RA-RD, the user W reads a barcode by means of the sensor of the sensor drive, which identifies the rack and is attached to the corresponding racks RA-RD.

Subsequently, the user W removes the good sought after and reads the barcode found on the good. Optionally, the user W then scans a barcode indicating the quantity if the goods removed from the rack.

Then the user W may scan a barcode associated with a box in which the goods are placed.

After that the user W receives an instruction to collect another good, possibly at another one of the racks RA-RD or to drop of the box at the packing station P.

These instructions repeat until the user W has finally collected all the goods being sought and has brought these to the packing station P. There, the user W reads the barcode again that is permanently attached to the packing station P.

As explained with respect to the first embodiment, at each step scan data values and associated order indicators are generated.

Figure 5:
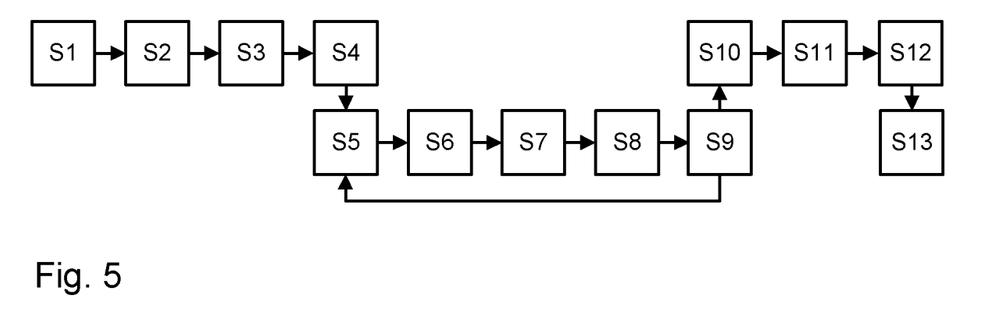
FIG. 5 shows a schematic flow chart of an embodiment of a method according to the disclosure.

For monitoring the work system 14, a method is carried out as shown in FIG. 5 as a simplified flowchart.

The monitoring method provides a grouped data set of the scan data values which allow to reconstruct the physical process actually carried out by the work system 14.

In step S1, the sensors 28 of the sensor devices 24 generate scan data values with associated order indicators as explained above.

In step S2, the acquired scan data values as well as the associated order indicators are transmitted to the monitoring system 16. This may be done directly from the sensor device 24, via the connection device 22 and/or the gateway 50. It is also possible that the scan data values as well as the associated order indicators are transmitted to the monitoring system 16 by the control system 20.

This way, each scan data value is assigned to an order indicator and vice versa. Transmittal of the scan data values and the associated order indicators may occur when the scan data values as well as the associated order indicators are generated or at a later point in time, in particular as a set of accumulated scan data values as well as the associated order indicators, possibly generated by different sensor devices 24.

The monitoring system 16 receives the scan data values and the associated order indicators in steps S3.

Then, in step S4, the monitoring system 16 converts each scan data value into a generalized value obtaining generalized data values. To this end, a predefined conversion scheme is stored in the monitoring system.

Even though generalized data values are used in the discussed embodiment, it is also conceivable that in the subsequent steps, the scan data values itself or scan data values that have been pre-processed differently are used.

The generalized data values are also character strings, in particular of the same length as the associated scan data values.

Generalization may be done by replacing each letter and each digit in the character string of the scan data values with a specific predefined substitution character.

For example, each letter in the character string of the scan data values is replaced in the character string of the associated generalized data value by a predefined letter substitution character, e.g. the character "l".

Each digit in the character string of the scan data values is replaced in the character string of the associated generalized data value by a predefined digit substitution character, e.g. the character "n".

Any other character, like hyphens, underscores, etc., remain unchanged.

The following table shows examples of scan data values and the associated generalized data value in which the respective scan data value has been converted:

| scan data value | generalized data value |
|---|---|
| TR22@COMPANY.DE | llnn@lllllll.ll |
| 6ER44M | nllnnl |
| COMPANY_AN96 | lllllll_llnn |
| CO_2422 | ll_nnnn |
| 9S8V4Y06DME | nlnlnlnnlll |
| US | ll |
| 10 | nn |

Thus, each scan data value is associated with a generalized data value.

Further, the order indicator (not shown in the table above) is still associated with the scan data value and, thus, also with the respective generalized data value.

The scan data value, the associated generalized data value and the associated order indicator may form a triplet which is used for the subsequent steps, i.e. any sorting, clustering or grouping action performed on either of the scan data value, the associated generalized data value and the associated order indicator is also applied to the other two of the scan data value, the associated generalized data value and the associated order indicator of the triplet.

In the next step S5, the similarities between each pair of the generalized data values is determined.

This may be done by applying a distance metric to each pair of the generalized data values as a metric for similarity between the values. The results may be a distance matrix.

For example, the Levenshtein distance metric or a metric derived of the Levenshtein metric is used.

Then, in step S6, the number of clusters is determined in which the scan data values are to be grouped.

For any possible number (i.e. integer) of clusters starting at a start value, e.g. 1, one or more evaluation algorithms are used to evaluate the suitability of the respective number of clusters to meaningful cluster the generalized data values based on the pairwise similarities determined in step S5.

The one or more evaluation algorithms are, for example, the algorithms by Frey, Dunn, Hubert, Rousseeuw or McClain or any algorithms based thereon.

The highest number of possible clusters evaluated is determined by a suitable breakup condition.

If only one evaluation algorithm is used, the evaluation result is the most suitable numbers of clusters determined by the respective algorithm.

If more than one evaluation algorithm is used, a consensus score of the results of the individual evaluation algorithms is calculated and the number of clusters with the best evaluation score is chosen as the evaluation result.

This evaluation result may be used as the number N of clusters for grouping the generalized data values.

For more precise grouping, in addition to the number of clusters resulting from the evaluation, additional clusters may be added.

One or more additional cluster may be added, if particularly short generalized data values are present in the data that is processed. Particularly short generalized data values are shorter than a predefined length threshold.

For example, one additional cluster is provided for generalized data values consisting only of the letter substitution character and having a length smaller than a predefined length threshold 2, 3 or 4.

One additional cluster may be provided for generalized data values consisting only of the digit substitution character and having a length smaller than a predefined length threshold of 2, 3, 4 or 5.

In the data shown in the table above, two additional clusters are provided, namely one because of the occurrence of generalized data value "ll" and another one because of the occurrence of generalized data value "nn".

Thus, in the above example, the number N of cluster to be used for grouping the generalized data values is the number of clusters resulting from the evaluation plus 2.

In step S7, the generalized scan data values—and with that the entire triplets—is grouped into N clusters.

For this purpose, a clustering algorithm is used which is provided with the number N of cluster, the generalized data values (or triplets), and optionally the determined pairwise similarities (e.g. the distance matrix).

For example, the Ward's hierarchical clustering algorithm is used.

It is conceivable that a user and/or administrator may manually change the cluster a specific scan data value or generalized data value has been grouped into.

Alternatively or in addition, the user and/or the administrator may have prior knowledge about the scan data values, e.g. the codes, and thus would like to ensure that specific scan data values or generalized data values are assigned to a specific cluster. In order to do so, the user or the administrator may manually set or define a cluster into which the specific scan data value or the corresponding generalized data value is to be grouped into. This may be done prior to grouping the scan data value into N clusters.

It is also conceivable that more than one clusters are set or defined manually by the user and/or the administrator.

In the next step, step S8, for each cluster a scan data cluster representative and/or a generalized data cluster representative is chosen from the scan data values and generalized data values grouped into the respective cluster.

The scan data value with the most similarity to the remaining scan data values in the respective cluster is chosen as the scan data cluster representative.

The distance metric, e.g. the Levenshtein distance, is used to the determine the similarity. The scan data value with the most similarity is, for example, the scan data value with the smallest square of the sum of the pairwise absolute distances, e.g. Levenshtein distances, to all the remaining scan data values of the respective cluster.

In the same fashion, the generalized data cluster representative is chosen for each cluster.

The scan data cluster representative and the generalized data cluster representative are in particular associated with one another or the scan data cluster representative convert into the generalized data cluster representative when applying the predefined conversion scheme.

In step S9, all scan data values are sorted into one cluster of the N clusters.

This sorting may have already been performed during grouping of the generalized data values as the triplet—and with that the scan data values—are grouped based on the respective generalized data value.

Alternatively or in addition, for example if only a sample of the data values has been used in steps S5 to S8 to generate the clusters, the scan data values are sorted based on the similarity, e.g. Levenshtein distance, with the scan data cluster representative of the clusters and/or based on the similarity, e.g. Levenshtein distance, of the associated generalized data value with the generalized data cluster representative of the clusters.

It is also conceivable that, alternatively or in addition to the comparison of the full character strings, only the first n characters of the scan/generalized data value are compared to the first n characters of the scan/generalized data cluster representative, wherein n being an integer, e.g. 3.

Scan data values and/or generalized data values that have a distance to any of the respective cluster representatives above a global threshold or above a threshold individual for each cluster, are regarded as unknown scan data values and sorted into an "unknown" cluster (this unknown cluster does, in particular, not count towards the N clusters).

This way, a grouped dataset of scan data values grouped into N clusters is obtained.

A signal may be outputted based on the grouped dataset. The signal may include the grouped dataset for further processing, a graphical representation of the grouped dataset or the like.

In step S10, connections between the clusters are determined. To this end, the scan data values or generalized data values of single ones of the sensor devices 24 or users W are evaluated with respect to the order in which the scan data values have been acquired.

For example, for each pair of scan data values or generalized data values that is consecutive and being acquired by the same sensor device 24 or the same user W a connection from the cluster of the earlier one of the data value of the pair of scan data values or generalized data values to the cluster of the later one of the data value of the pair of scan data values or generalized data values is registered.

Connections between the same cluster may also occur indicating a loop.

Consecutive pairs of data values are identified using the information of the order indicator.

The number of connections between pairs of clusters in the same direction is summed up indicating the frequency of two clusters occurring consecutively.

In step S11, which may be carried out before, after or simultaneously to step S9 and/or S10, the clusters and/or the cluster representatives, are assigned to real-world counterparts, for example a specific type of objects, a specific object, a specific location and/or a specific type of information.

This may be done automatically, for example using information provided by the control system 20 about the physical process.

It is also conceivable that the clusters, the scan data cluster representative or the generalized data cluster representatives are provided to an operator of the work system 14, which identifies the scan data cluster representative or the generalized data cluster and their purpose.

For example, types of objects may be "item" or "box", specific objects may be "shelf 1" or "door A3", a specific location may be "packing station" or "rack RA", and/or a specific type of information may be "quantity", "user ID" or "address".

For the physical process described with respect to FIG. 4, the clusters may be assigned to a type of object ("goods"), namely codes identifying goods to be picked, a type of object ("box"), namely codes identifying the box in which goods are places, a specific type of information ("quantity"), namely the quantity of goods that have just been placed in the box, a specific location ("location"), namely codes being permanently attached to locations, e.g. rack RC, and a specific type of information ("user ID"), namely codes identifying the user, e.g. on user badges.

Further, the "unknown" cluster is present for codes that could not be sorted into a cluster.

In step S12, a representation, in particular a graphical representation of the grouped dataset with assigned clusters and connections may be generated which represents the actual physical process carried out by the work system 14.

Figure 6:
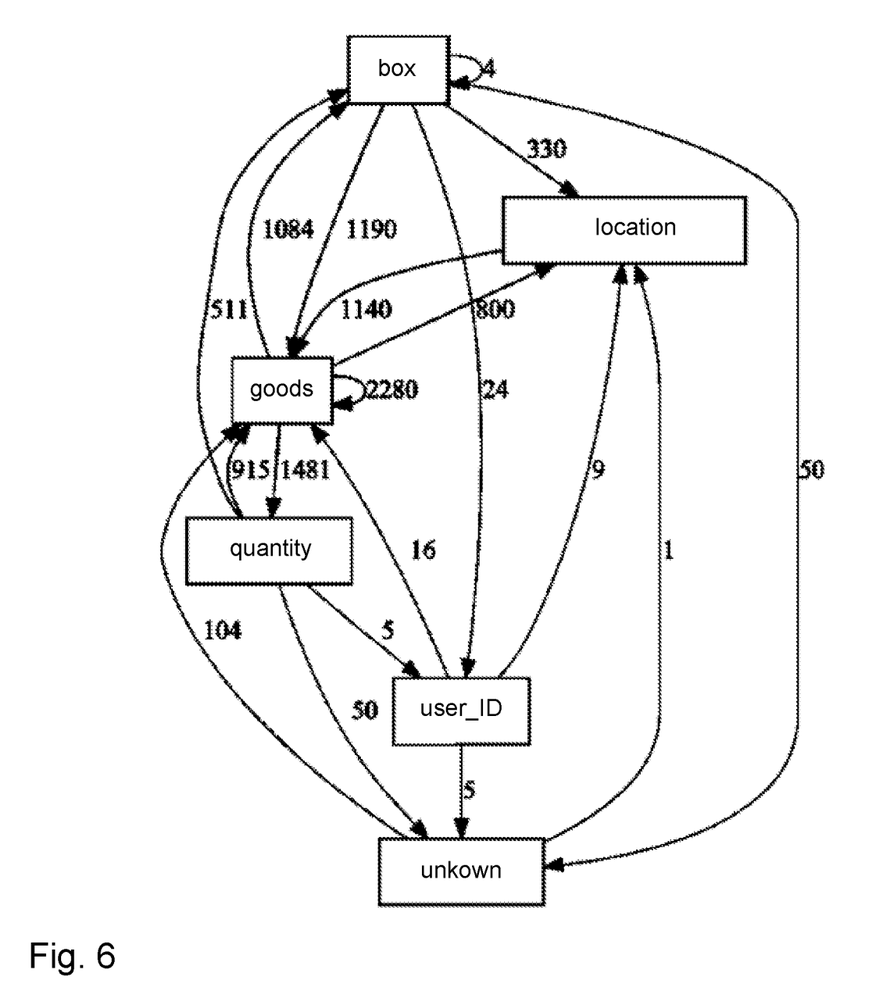
FIG. 6 shows a graphical representation of the physical process generated according to the method of FIG. 5.

FIG. 6 shows an example graphical representation of the physical process actually carried out by the work system 14 shown in FIG. 4.

It shows very well the codes read during the operation of the work system 14 illustrating the sequence of the physical process steps associated with the codes read, e.g. picking up a good ("goods"), inputting the number of goods picked up ("quantity"), placing the goods in the box ("box"). The process is the repeated often, sometimes with a change in the rack ("location") at which the goods are picked up or a drop-off at the packing station ("location").

In step S13, the grouped dataset and/or the representation may be transmitted to the control system 20, an inventory management system, an enterprise resource planning system, a mobile end device, a workplace computer or an output means.

One, several or all of steps S3 to S13 are carried out by the monitoring system 16.

The monitoring system 16 or an analysis system (not shown) receiving the grouped data and/or the representation of the physical process may identify bottlenecks in the process or deviations from the physical process intended to be carried out by the work system 14.

The monitoring system 16 or an analysis system then controls the work system 14 to resolve the bottleneck or deviation. For example, the monitoring system 16 or analysis system may send a corresponding method to the control system 20 of the work system 14, which in turn controls the sensor devices 24 accordingly.

In this way, the sensor devices 24 are controlled based on the grouped dataset or the representation of the physical process.

For example, the control system 20 controls some of the sensor devices 24 to show a message to the user W indicating to the user W that he/she should change the workstation 18.

This way, a method for monitoring a complex work system 14 is provided that is capable of providing detailed information about the physical process of the work system 14 with little input apart from the data that is generated during operation of the work system 14.

In a further embodiment of the method, one, several or all of the N clusters are clustered further into subclusters to increase precision.

To this end, steps S5 to S9 are carried out for each cluster to be clustered further, obtaining subclusters.

For each subcluster, a scan data cluster representative and/or generalized data cluster representative is generated and the data of the cluster is sorted into the subclusters.

Further, the connections between the subclusters are determined like in step S10 and the steps are assigned to real-world counterparts, for example types of objects, specific objects, locations or information as in step S11.

It is also conceivable that the subclusters are treated as regular clusters for steps S11 and subsequent steps.

For increasing performance of clustering, steps S5 to S8 for determining clusters and/or subclusters may be carried out only on a part of the respective scan data values, in particular a stratified sample of the respective scan data values.

The invention claimed is:

1. A method for monitoring a work system comprising at least one sensor device with a sensor, wherein the method comprises steps of:
   receiving a plurality of scan data values acquired by the sensor of one or more of the at least one sensor device and order indicators associated with the scan data values indicating the order in which the scan data values have been acquired,
   determining similarities between the scan data values by determining similarities between one of the plurality of scan data values and the others of the plurality of scan data values one by one,
   determining a number of clusters for grouping the scan data values based on the determined similarities,
   grouping the scan data values into a number of clusters, wherein the number of clusters is determined based on the determined similarities,
   assigning the scan data values to the clusters obtaining a grouped dataset of the scan data values, and
   outputting a signal based on the grouped dataset.

2. The method according to claim 1, wherein the order indicators include at least one of a time stamp of the time the associated scan data value has been acquired, an identifier of a user, or an identifier of the sensor device which has acquired the associated scan data value.

3. The method according to claim 1, wherein the determining the similarities between the scan data values includes:
   converting the scan data values in generalized data values according to a predefined conversion scheme, and
   determining similarities between the generalized data values, wherein the similarities between the generalized data values are used as the similarities between the respective scan data values.

4. The method according to claim 3, wherein the predefined conversion scheme includes at least one of converting each letter of the scan data values into a predefined letter substitution character, for example the character "1", or converting each numerical digit of the scan data values into a predefined digit substitution character.

5. The method according to claim 3, wherein for grouping the scan data values into the number of clusters, the generalized scan data values are grouped into the number of clusters.

6. The method according to claim 1, wherein for determining the similarities, a distance metric is applied.

7. The method according to claim 1, wherein the number of clusters is determined by evaluating a suitability of different numbers of clusters for clustering at least one of the scan data values or generalized data values based on the similarities using one evaluation algorithm, wherein the number of cluster with a best evaluation is chosen as an evaluation result or more than one evaluation algorithm, wherein a consensus score of the results of the evaluation algorithms is calculated and the number of clusters with the best evaluation score is chosen as an evaluation result.

8. The method according to claim 7, wherein the number for the number of clusters is the evaluation result plus 1 per additional cluster provided for short scan data values or generalized data values.

9. The method according to claim 1, wherein a clustering algorithm is used for grouping the scan data values or generalized data values into the N number of clusters.

10. The method according to claim 1, wherein for each cluster, at least one of a scan data value or a generalized data value of the respective cluster is chosen as a scan data cluster representative or generalized data cluster representative, respectively.

11. The method according to claim 1, wherein the number of clusters are assigned to at least one of a specific type of objects, a specific object, a specific location or a specific type of information.

12. The method according to claim 1, wherein connections between the clusters are determined.

13. The method according to claim 12, wherein a representation of a physical process carried out by the work system is generated based on at least one of the grouped dataset or connections between the clusters.

14. The method according to claim 1, wherein a control system of the work system controls the plurality of sensor devices at least in part for a purpose of executing a physical process assigned to corresponding sensor devices.

15. The method according to claim 1, wherein at least one of:
   the sensor of the sensor devices is at least one of a camera, an optical code reader, or an RFID code reader, or
   the sensor device comprises at least one actuating element, or
   the sensor device comprises at least one output means.

16. The method according to claim 1, wherein the work system comprises a plurality of connection devices, wherein each connection device is connected to one or more of the sensor devices via a wireless communication link and is connected to a control system via a wired or wireless communication link or is configured on a same device.

17. The method according to claim 1, wherein a scan data value is generated by the sensor of the sensor device.

18. The method according to claim 1, wherein at least one of the grouped dataset or a representation of a physical process is transmitted to at least one of a control system, an inventory management system, an enterprise resource planning system, a mobile end device, a workplace computer or an output means.

19. A system comprising a monitoring system and a work system comprising a plurality of sensor devices with a sensor, wherein the system is configured to carry out a method for monitoring a work system comprising at least one sensor device with a sensor, wherein the method comprises steps of:
- receiving a plurality of scan data values acquired by the sensor of one or more of the at least one sensor device and order indicators associated with the scan data values indicating the order in which the scan data values have been acquired,
- determining similarities between the scan data values by determining similarities between one of the plurality of scan data values and the others of the plurality of scan data values one by one,
- determining a number of clusters for grouping the scan data values based on the determined similarities,
- grouping the scan data values into a number of clusters, wherein the number of clusters is determined based on the determined similarities,
- assigning the scan data values to the clusters obtaining a grouped dataset of the scan data values, and
- outputting a signal based on the grouped dataset.

20. A computer program stored on a non-transitory storage medium comprising instructions which, when the computer program is executed by a computer, cause the computer to carry out a method for monitoring a work system comprising at least one sensor device with a sensor, wherein the method comprises steps of:
- receiving a plurality of scan data values acquired by the sensor of one or more of the at least one sensor device and order indicators associated with the scan data values indicating the order in which the scan data values have been acquired,
- determining similarities between the scan data values by determining similarities between one of the plurality of scan data values and the others of the plurality of scan data values one by one,
- determining a number of clusters for grouping the scan data values based on the determined similarities,
- grouping the scan data values into a number of clusters, wherein the number of clusters is determined based on the determined similarities,
- assigning the scan data values to the clusters obtaining a grouped dataset of the scan data values, and
- outputting a signal based on the grouped dataset.

* * * * *